United States Patent [19]

Rosenblum et al.

[11] Patent Number: 5,567,523

[45] Date of Patent: Oct. 22, 1996

[54] MAGNETIC RECORDING MEDIUM COMPRISING A CARBON SUBSTRATE, A SILICON OR ALUMINUM NITRIDE SUB LAYER, AND A BARIUM HEXAFERRITE MAGNETIC LAYER

[75] Inventors: Stephen S. Rosenblum, Palo Alto; Jinshan Li, Newark; Hidetaka Hayashi, Saratoga, all of Calif.

[73] Assignee: Kobe Steel Research Laboratories, USA, Applied Electronics Center, Palo Alto, Calif.

[21] Appl. No.: 325,069

[22] Filed: Oct. 19, 1994

[51] Int. Cl.$^6$ ............................................. G11B 5/66
[52] U.S. Cl. ............................ 428/408; 428/694 TS; 428/694 ST; 428/900
[58] Field of Search ..................................... 428/408, 65.3, 428/694 TS, 694 ST, 900

[56] References Cited

U.S. PATENT DOCUMENTS

| | | |
|---|---|---|
| 4,411,963 | 10/1983 | Aine . |
| 4,654,276 | 3/1987 | Ahlert et al. . |
| 4,716,078 | 12/1987 | Kishine et al. . |
| 4,738,885 | 4/1988 | Matsumoto ............................ 428/64 |
| 4,743,491 | 5/1988 | Asada et al. ........................... 428/213 |
| 4,774,140 | 9/1988 | Wakasa et al. . |
| 4,789,598 | 12/1988 | Howard et al. . |
| 4,828,905 | 5/1989 | Wada et al. ........................... 428/213 |
| 4,833,020 | 5/1989 | Shiroishi et al. ...................... 428/336 |
| 4,957,604 | 9/1990 | Steininger . |
| 5,045,298 | 9/1991 | Muramatsu et al. . |
| 5,057,364 | 10/1991 | Saito et al. . |
| 5,063,120 | 11/1991 | Edmonson et al. . |
| 5,064,720 | 11/1991 | Kempo et al. . |
| 5,066,534 | 11/1991 | Goto et al. . |
| 5,066,552 | 11/1991 | Howard et al. . |
| 5,069,949 | 12/1991 | Matsuda et al. . |
| 5,074,983 | 12/1991 | Eltoukhy et al. . |
| 5,078,846 | 1/1992 | Miller et al. . |
| 5,084,152 | 1/1992 | Lin . |
| 5,227,204 | 7/1993 | Vittoria ................................. 427/596 |
| 5,326,607 | 7/1994 | Muramatsu et al. . |

FOREIGN PATENT DOCUMENTS

| | | |
|---|---|---|
| 0214539 | 3/1987 | European Pat. Off. . |
| 61-258353 | 11/1986 | Japan . |
| 62-078715 | 4/1987 | Japan . |
| 62-125525 | 6/1987 | Japan . |
| 01042023A | 2/1989 | Japan . |

OTHER PUBLICATIONS

*Magnetic Recording*, (1987), 1, pp. 148–149, "3.2.2.6 Barium Ferrite".
*Magnetic Recording*, (1987), 1, pp. 198–203, "3.3.2.2 Substrate and Undercoat Preparation".
*Magnetic Recording*, (1987), 1, pp. 216–222, "Perpendicular Anisotropy Films".
*Microchip Fabrication*, (1984), pp. 204–208, Semiconductor Services, San Jose, CA.
*IEEE Transactions on Magnetics*, Sep. 1986, Mag–22, pp. 1146–1148, "Ba–ferrite Thin Film Rigid Disk for High Density Perpendicular Magnetic Recording", A Morisako et al.
*J. Appl. Phys.*, Apr. 1985, 57, pp. 4040–4042, "Ba–ferrite Thin Film Disk for Perpendicular Magnetic Recording", M. Matsuoka et al.
*Popular Science*, (Aug. 1992), p. 40, "Super–Density Floppies".

Primary Examiner—Stevan A. Resan
Attorney, Agent, or Firm—Oblon, Spivak, McClelland, Maier & Neustadt, P.C.

[57] ABSTRACT

Magnetic recording media suitable for high density recording are provided by a carbon substrate, a magnetic recording layer, and at least one interlayer therebetween which provides one or more properties beneficial to preventing diffusion, inducing a preferred orientation in the magnetic recording layer and/or promoting adhesion between a carbon substrate and a barium hexaferrite-based magnetic recording layer. Alternatively, the present magnetic recording media may contain two different interlayers, which bar diffusion of carbon atoms from said substrate to said magnetic recording layer, improve adhesion between adjacent layers, induce an orientation in the magnetic recording layer, or any combination thereof. The present recording media are particularly advantageous for perpendicular recording. Processes for producing these magnetic recording media are also provided.

8 Claims, No Drawings

MAGNETIC RECORDING MEDIUM COMPRISING A CARBON SUBSTRATE, A SILICON OR ALUMINUM NITRIDE SUB LAYER, AND A BARIUM HEXAFERRITE MAGNETIC LAYER

BACKGROUND OF THE INVENTION

1. Field of the Invention

The present invention concerns-magnetic recording media suitable for high density recording, containing a carbon substrate, a magnetic recording layer, and at least one interlayer therebetween which provides one or more properties beneficial to preventing diffusion, inducing a preferred orientation in the magnetic recording layer and/or promoting adhesion between a carbon substrate and a barium hexaferrite-based magnetic recording layer. The present invention also concerns a process for producing the magnetic recording medium.

2. Discussion of the Background

Magnetic recording media such as-magnetic disks are now widely used for audio, video and computer applications. In a magnetic recording system, recording and reproducing are conducted by means of a magnetic head. A pattern of remanent magnetization is formed along the length of a track or a number of parallel tracks on a magnetic recording medium by means of the recording head. The recorded magnetization creates a pattern of magnetic fields which are used to read the data stored in the magnetic recording medium. When the recorded magnetic medium is passed by the same or a similar recording head, the pattern of magnetization can be read by the recording head and the recorded data reconstructed by appropriate electrical processing.

Recent efforts in the field of magnetic recording media have centered on the development of higher areal densities by increasing both the linear recording density as well as the track densities on the magnetic recording medium. Substantial increases in both linear and track densities require improvements in both magnetic recording materials and in recording techniques and components.

Magnetic recording requires an interaction between the surface of the magnetic recording medium and the recording head. High density recording requires that the distance between the magnetic recording medium and the recording head be as small as possible. With decreasing distances between the recording head and the surface of the recording medium, however, problems associated with the material properties of the magnetic head and the magnetic recording material arise.

For example, the surface of the magnetic recording medium must be finished to a mirror smooth surface to allow the recording head to approach the surface as closely as possible. At these close spacing distances, problems associated with friction and subsequent wear of a magnetic recording layer may result in deterioration of the recording head and medium. The surface smoothness and adhesion of magnetic recording layers to substrates on which they are deposited is, therefore, particularly important with high density recording media.

The standard substrate material for hard disk recording media is high-purity aluminum-magnesium alloy, coated with a nickel-phosphorus (Ni—P) alloy. Glass substrates have also been used, but suffer from problems associated with brittleness and fracture during assembly and operation (*Magnetic Recording*, C. D. Mee and E. D. Daniel, Vol. I, pp. 100 and 198–203, McGraw-Hill, Inc., 1987). More recently, carbon substrates have been proposed (U.S. Pat. Nos. 5,045, 298 and 4,716,078).

Magnetic disks having high density memory capacity have been prepared by depositing a magnetic oxide or magnetic metal film onto the substrate surface. The medium film is conventionally deposited by means of a sputtering process (U.S. Pat. No. 4,411,963). Conventional sputtering processes include diode, triode and magnetron sputtering processes (*Microchip Fabrication*, P. Van Zant, pp. 204–208, Semiconductor Services, San Jose, Calif. 1984).

Magnetic recording materials may be utilized for both longitudinal (horizontal) and perpendicular (vertical) recording. Magnetic thin film thicknesses of 500–5,000 Å are particularly preferred for perpendicular magnetic recording applications. Magnetic thin films having a thickness of about 200–800 Å are particularly preferred for longitudinal recording applications. Many metal alloy thin films have been proposed for these applications (see, for example, U.S. Pat. Nos. 5,063,120, 5,084,152 and 4,654,276). Metal alloy films containing oxygen are also known (U.S. Pat. No. 5,066,552). These films may be deposited by conventional sputtering processes.

There are many compounds containing Ba, Fe and O. However, only one, barium ferrite (also known as barium hexaferrite, barium magnetoplumbite and/or $BaFe_{12}O_{19}$) is useful for magnetic recording. Barium ferrite thin films have been investigated as possible magnetic recording layers for disk recording media. Ceramic barium ferrite has excellent hardness and resistance to environmental degradation, high magnetocrystalline anisotropy, high coercivity and a square hysteresis loop leading to high recording density. Barium ferrite films have also been produced on oxidized silicon wafers using a conventional rf diode sputtering system (A. Morisako, M. Matsumoto, and N. Naoe, *IEEE Transactions on Magnetics*, Vol. MAG-22(5):1146–1148, 1986). However, crystalline barium ferrite films generally require high substrate temperatures (400°–650° C.) during sputtering (*Magnetic Recording*, pp. 217).

The small distances between the recording head and the recording medium, critical to reaching higher densities on hard disks, give rise to disk wear, as noted above. Overcoat layers are known to provide a wear-resistant layer and to minimize disk wear. Overcoat layers prepared from rhodium, carbon, TiC, TiN, SiC, $Cr_2C_3$ and $Al_2O_3$ have been suggested (*Magnetic Recording*, pp. 219–222; and U.S. Pat. No. 4,789,598). A protective overcoat layer of hafnia and zirconia has also been proposed (U.S. Pat. No. 5,078,846).

Use of some metal nitrides (e.g., aluminum nitride or AlN) as interlayers in composite materials (such as an optical surface film) is known. For example, U.S. Pat. No. 5,270,263 discloses a process for depositing AlN using nitrogen plasma sputtering and the use of sputtered AlN as an etch stop in silicon semiconductor manufacturing. For this use, its etching properties with respect to other films are important. Uses of AlN as a passivation layer, a ceramic packaging material, a mask for ion implantation for Si and a window for GaAs solar cells are suggested. However, in U.S. Pat. No. 5,270,263, AlN is sputtered onto Si or GaAs, rather than carbon. A good lattice match to Si and GaAs is considered important.

U.S. Pat. No. 5,202,880 discloses AlN or $Si_3N_4$ as a dielectric layer on a magneto-optical TbFeCo alloy medium, which permits recording on both sides of each substrate. The dielectric layer is placed between a reflective metal layer (Al) and the media layer to prevent corrosion and enhance the Kerr effect. $Si_3N_4$ is used as an overcoat to protect the TbFeCo alloy medium from corrosion caused by the Al reflective coating.

U.S. Pat. No. 5,132,238 discloses a thin film superconductor assembly, in which AlN is used as an electrically-insulating, thermally-conducting medium in a superconducting cable. AlN is applied between an aluminum substrate and a superconducting medium to electrically insulate one from the other while simultaneously providing good heat transport between the two. Aluminum oxynitride is also suggested as a possible material. Sputtering and direct nitridation of the aluminum-containing substrate are suggested methods for forming AlN.

U.S. Pat. No. 4,844,989 discloses a superconducting structure with layers of niobium nitride and aluminum nitride. The deposition of AlN/NbN multilayer films and their uses as a superconducting structure for power transmission, a Josephson junction and a microwave source are described. Methods of forming the multilayer films include sputtering. The selection of AlN and NbN was based on a good lattice match and the electrical insulating property of AlN.

U.S. Pat. No. 4,677,042 discloses a mask structure for lithography, in which AlN is used as a substrate. The mask is used in X-ray lithography of very fine structures. The AlN properties of interest are the high X-ray and visible light transmittance, low coefficient of thermal expansion, high thermal conductivity and ease of film formation. The films can be multilayers of polymers and AlN or BN/AlN, and the thickness of the film is 20 microns.

However, it is believed that the use of AlN as an intermediate film in a magnetic recording medium was not known prior to the present invention.

Thin films of a different metal nitride, TiN, have been used as a diffusion barrier between metals and silicon (see U.S. Pat. Nos. 5,279,857, 5,279,985, 5,277,985, 5,275,715, 5,268,590, 5,250,467, 5,242,860 and 5,240,880).

Oxide films have also been used as interlayers in composite films. For example, $Al_2O_3$, an extensively studied material, has been deposited by sputtering or CVD as a thin film (see Ohring, "The Materials Science of Thin Films," Milton Academic Press, Inc., Boston, 1992, page 547ff).

An orientation-inducing interlayer is described in a magnetic recording medium containing a barium ferrite film. For example, oriented barium ferrite thin films can be grown on $SiO_2/Si$ wafer disks on which a c-axis-oriented ZnO film has been deposited (M. Matsuoka, M. Naoe, and Y. Hoshi, *J. Appl. Phys.*, 57(1):4040–4042, 1985). Oriented barium ferrite thin films are obtained using a facing target-type sputtering system and a substrate temperature of 500° C. However, in the case where zinc oxide was deposited on a silicon wafer, no cleaning of the surface was reported. Accordingly, a thin silicon oxide surface layer may have been present in the silicon wafer substrate containing onto which a ZnO layer was deposited.

Substitution of certain elements or ions for iron atoms or ions in barium ferrite to modify its magnetic properties is known (see "Ferromagnetic Materials," vol. 3, E. P. Wohlfarth, ed. North Holland, Amsterdam (1982), referring to Kojima, "Fundamental Properties of Hexagonal Ferrites with Magnetoplumbite Structure," pp. 367ff). In general, the requirements for a replacement atom or ion in barium hexaferrite are that it fit-into the iron site of the magnetoplumbite lattice without significant distortion, and that the average formal charge be 3+ to retain electroneutrality.

A need exists for improved magnetic recording media (and in particular, disk magnetic recording media) which are useful for high density magnetic recording, and in which one or more interlayers provide one or more properties beneficial to preventing diffusion, inducing a preferred orientation in the magnetic recording layer and/or promoting adhesion between a carbon substrate and a barium hexaferrite-based magnetic recording layer.

SUMMARY OF THE INVENTION

Accordingly, one object of the present invention is to provide a magnetic recording medium having improved magnetic and physical properties, suitable for high density magnetic recording, and a process for producing the same.

A further object of the present invention is to provide a magnetic recording medium having an interlayer which prevents diffusion of atoms between various layers of the medium (for example, between the carbon substrate and the barium hexaferrite magnetic recording layer).

A further object of the present invention is to provide a magnetic recording medium having an interlayer which induces a particular molecular or crystalline orientation in the magnetic recording layer.

A further object of the present invention is to provide a magnetic recording medium having an interlayer which possesses at least two diffusion barrier, orientation-inducing or other properties (e.g., improving adhesion between adjacent layers of the medium).

A further object of the present invention is to provide a magnetic recording medium having two or more interlayers with such properties.

A further object of the present invention is to provide a process for producing a magnetic recording medium having one, two or more than two interlayers.

These and other objects, which will become apparent from the following detailed description of the preferred embodiments, have been achieved by the present magnetic recording medium, which may comprise:

a carbon substrate;

a magnetic recording layer of the formula $BaFe_{12}O_{19}$ or $Ba(M^1M^2)_xFe_{12-2x}O_{19}$, wherein $0<x<4$, and either (i) $M^1$ and $M^2$ are the same and are selected from the group consisting of Al, Ga and Cr, or (ii) $M^1$ is selected from the group consisting of Co, Zn, Cu, Ni and combinations thereof, and $M^2$ is selected from the group consisting of Ti, Ir, Ge, Sn, Zr, V, Nb, Ta, Mo, Si and combinations thereof; and at least one interlayer therebetween;

wherein the recording medium has a longitudinal recording direction, a perpendicular recording direction (defined to be with magnetization perpendicular to the surface) and at least one property selected from the group consisting of: (a) a coercivity ($H_c$) in at least one of the recording directions of from 500 to 4,500 Oe, preferably 1000 to 4,000 Oe, and most preferably from 1,500 to 3,000 Oe, (b) a remanence-thickness product ($M_rt$) in at least one of the recording directions of from 0.1 to 10 memu/cm$^2$, preferably from 0.5 to 5 memu/cm$^2$; (c) a coercive squareness (S*) in at least one of the recording directions of from 0.3 to 1, preferably from 0.5 to 1, and most preferably from 0.6 to 1; and (d) a signal-to-noise ratio of greater than 10 dB, preferably greater than 18 dB, and most preferably greater than 28 dB.

The present magnetic recording medium may also comprise, in addition to the carbon substrate and the magnetic recording layer described above, first and second interlayers therebetween which are different from each other and which (i) bar diffusion of carbon atoms from the substrate to the barium hexaferrite magnetic recording layer, (ii) improve adhesion between adjacent layers, (iii) provide at least one of the properties (a)–(g) above, or (iv) any combination thereof.

DETAILED DESCRIPTION OF THE PREFERRED EMBODIMENTS

The recording medium of the present invention is a multilayer structure containing a (substituted) barium hexaferrite magnetic recording layer, at least one interlayer and a carbon base or substrate layer. Accordingly, the present recording medium may comprise, consist essentially of or consist of three layers (carbon substrate, interlayer and recording layer), four layers (carbon substrate, two interlayers and recording layer), or more than four layers (i.e., up to as many layers as can be present in a functional recording medium). The term "interlayer" refers to any layer of the present magnetic recording medium which is interposed between the carbon substrate and the barium hexaferrite layer.

In each of the following aspects of the present invention, the magnetic recording medium may further comprise (a) an overcoat layer to protect the medium, (b) an adhesive layer between such an overcoat layer and the recording layer, (c) a layer which prevents or inhibits oxidation of an interlayer or the carbon substrate during deposition of the recording layer, (d) any other layer which does not adversely affect the magnetic properties of the recording medium, or (e) any combination of such layers, as desired. Additional layers may be deposited on or interposed between any two layers of the present magnetic recording medium, including the further layers (a)–(d) above, as long as the recording medium retains sufficient magnetic properties to remain functional.

The Carbon Substrate

Suitable substrate materials for use in the present magnetic recording medium include all high-temperature capability, carbon-based materials which can be used as a hard disk support. Carbon hard disk support substrates should be rigid, shock resistant (i.e., be able to withstand dropping onto hard surfaces and to withstand the high centrifugal forces (high rpm) required for spinning hard disk applications), and must have very flat and smooth surfaces.

Preferred substrates are amorphous carbon substrates which are lightweight, strong and capable of withstanding the high deposition temperatures (400°–700° C.) which may be required for deposition of subsequent layers (e.g., barium hexaferrite) by conventional sputtering processes. Suitable amorphous carbon substrates include, for example, amorphous carbon substrates prepared by carbonizing or pyrolyzing molded thermosetting resins, optionally containing carbon fillers such as graphite, carbon black, etc. Such carbon substrates may be formed by cast molding, compression molding, injection molding or any other known molding method.

To reduce surface abrasion, it is particularly preferable that the amorphous carbon substrate have an apparent density of 1.75 g/cm$^3$ or more. These particularly preferred amorphous carbon substrates can be prepared by molding a thermosetting resin, followed by a preliminary heating or sintering at a temperature of about 1,000°–1,900° C. to eliminate gaseous components. Following this preliminary sintering process, pores are eliminated by hot isostatic pressing (HIP) at pressures not less than about 1,000 atm, at a temperature of not less than 2,050° C. Preferred HIP treatments are conducted at a temperature of 2,050°–2,600° C. and under a pressure of at least 1,000 atm. Such particularly preferred carbon substrates are described in U.S. Patent Nos. 4,716,078 and U.S. Pat. No. 5,045,298, incorporated herein by reference in their entirety to provide a more complete description of (1) the preferred carbon substrates suitable for use in the present invention, and (2) methods of preparing the same. A most particularly preferred carbon substrate is the ultra-densified amorphous carbon (UDAC) rigid disc substrate, obtainable from Kobe Steel Limited, 3–18 Wakinohamacho 1-chome, Chuo-Ku, Kobe, Hyogo, 651 Japan.

Preferably, prior to application of the interlayer(s) of the present recording medium, the carbon substrate is cleaned by an aqueous cleaning process, comprising applying a detergent solution to the substrate, scrubbing with a sponge, dipping in dilute hydrochloric acid, rinsing, and drying. Preferably, the sponge is a PVA (polymer or copolymer of polyvinyl alcohol) sponge; the dilute hydrochloric acid has a concentration of 3N; rinsing is performed using deionized water; and drying comprises spin drying, and more preferably, spin drying in hot, dry nitrogen.

The substrate is then transferred to the vacuum chamber and baked at 400° C. for 15 minutes. The substrate is then preferably sputtered-cleaned for 1–10 minutes using rf glow discharge at 10–500 (e.g., 100) watts of applied power, in a vacuum of 0.1–100 (e.g., 5) mTorr, and in a mixture of 0–75% (e.g., 50%) $O_2$ in Ar gas, to clean the surface of any remaining contaminants. Further layers are then successively applied to the cleaned substrate.

The Magnetic Recording Layer

The magnetic recording film is barium hexaferrite, the iron atoms of which may be substituted with a single metal or a combination of two metals providing an average formal charge of 3+ ("substituted" barium hexaferrite). Hereinafter, the phrase "(substituted) barium hexaferrite" refers to either pure barium hexaferrite or substituted barium hexaferrite.

The single metal which may be substituted for iron in barium hexaferrite may be selected from the group consisting of Al, Ga and Cr. When a combination of two metals is present in the substituted barium hexaferrite, the first is selected from the group consisting of Co, Zn, Cu, Ni and mixtures thereof, and the second is selected from the group consisting of Ti, Si, Ir, Ge, Sn, Zr, V, Nb, Ta and mixtures thereof. When the second metal of the combination has a formal 4+ charge, it is present as an equimolar mixture with the first metal. However, when the second metal of the combination has a formal 5+ charge, it is present in a molar ratio of 1:2 with respect to the first metal to provide an overall 3+ charge for the ($M^1 M^2$) moiety.

The (substituted) barium hexaferrite recording layer is deposited as a continuous film in a manner described below onto the interlayer furthest removed from the substrate. Barium hexaferrite and substituted barium hexaferrite have a hexagonal crystal structure. Films of (substituted) barium hexaferrite having a thickness up to about 500 Å form an amorphous thin film. Films having a thickness of about 500–5,000 Å form thin films having the characteristic hexagonal crystal structure. The thickness of the present magnetic recording film is preferably, but not limited to, from about 100 to 10,000 Å, more preferably from about 500 to 5,000 Å, and most preferably from about 1,000 to 3000 Å.

Very high coercivity may be achieved when and where desired by using unsubstituted barium hexaferrite in the present invention. However, lowering the coercivity of the magnetic recording film may permit writing with existing thin film heads. Thus, where it is desired or desirable for the magnetic recording film to have a lower coercivity than pure barium hexaferrite, substituted barium hexaferrite may be advantageously employed. A preferred substituted barium hexaferrite comprises a material of the formula:

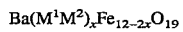

$$Ba(M^1M^2)_xFe_{12-2x}O_{19}$$

wherein either (i) $M^1$ and $M^2$ are the same and are selected from the group consisting of Al, Ga and Cr, or (ii) $M^1$ is selected from the group consisting of Co, Zn, Cu, Ni and combinations thereof, and $M^2$ is selected from the group consisting of Ti, Ir, Ge, Sn, Zr, V, Nb, Ta, Mo, Si and combinations thereof. A more preferred, but conventional, substituted barium hexaferrite comprises a material of the formula:

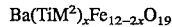

$$Ba(TiM^2)_xFe_{12-2x}O_{19}$$

where (i) $M^2$=Co and $0.1<x<3$ or (ii) $M^2$=Zn and $0.1<x<3$. More preferably, when $M^2$=Co, x is from 0.1 to 2, and when $M^2$=Zn, x is from 0.1 to 3.

A more preferred substituted barium hexaferrite is one of the formula $Ba(TiZn)_{0.3}Fe_{11.4}O_{19}$ (modified MC-617, sold by Toda Kogyo Corp., 7-1, Yokogawa-shinmachi, Nishi-ku, Hiroshima, 733 Japan, prepared without a $SiO_2$ coating). Other (substituted) barium hexaferrites prepared by Toda Kogyo suitable for use in the present magnetic recording medium include those sold under the tradenames MC-710, MC-127, MC-136, SMC-717 and SMC-410. However, a $SiO_2$ coating typically applied to the commercially available powders should be omitted to minimize impurities.

The Interlayer(s)

In the present invention, a magnetic recording layer is deposited onto an interlayer (previously deposited onto a suitable substrate) to form a magnetic recording medium. The interlayer furthest removed from the substrate may preferably, but is not required to, provide a smooth surface onto which the magnetic recording layer is deposited. The magnetic recording layer also preferably adheres tightly to the interlayer furthest removed from the substrate to provide a stable magnetic recording medium.

In one aspect of the present invention, an interlayer which induces or provides an advantageous magnetic property in barium hexaferrite is deposited on a carbon substrate. A magnetic barium hexaferrite layer is subsequently deposited on the "magnetic property-enhancing" interlayer to form a magnetic recording medium. The magnetic property-enhancing layer results in the recording medium having at least one of the following advantageous magnetic recording properties:

(a) a coercivity ($H_c$) in at least one of the recording directions (i.e., longitudinal and/or perpendicular) of from 500 to 8,000 Oe, preferably 800 to 5,000 Oe, and most preferably from 1,000 to 4,000 Oe;

(b) a remanence-thickness product ($M_rt$) in at least one of the recording directions of from 0.1 to 10 memu/cm², preferably from 0.3 to 5 memu/cm²;

(c) a coercive squareness (S*) in at least one of the recording directions of from 0.3 to 1, preferably from 0.5 to 1, and most preferably from 0.6 to 1; and (d) a signal-to-noise ratio of greater than 10 dB, preferably greater than 18 dB, and most preferably greater than 28 dB.

Preferably, the present magnetic recording medium has at least two, and more preferably, at least three of the properties (a)–(d) above. In addition, the present magnetic recording medium may also have one or more of the following properties:

(e) good environmental stability (i.e., maintaining its recording performance over time under a variety of temperature, humidity, and other environmental factors [such as proximity to electromagnetic fields]); and (f) stability (maintenance of magnetic properties) with respect to time (aging).

In the context of the present invention, the remanence-thickness product ($M_rt$) is determined by a method using a conventional vibrating sample magnetometer. The hysteresis loop is measured for the recording medium. The area of the magnetic recording film and the remanent moment (in emu) are determined in accordance with known methods (see, for example, Mee et al, "Magnetic Recording, Vol. 1: Technology," McGraw-Hill, Inc., New York (1987)). As long as the magnetometer is properly calibrated on a standard sample (e.g., Ni foil), variability in $M_rt$ determinations is consistently about 10% or less.

Further, in the present application "squareness" (S) refers to the remanent moment divided by the saturation moment of the medium, according to the formula:

$$S = M_r/M_2$$

The coercive squareness, S*, is determined in accordance with the method disclosed by Mee et al ("Magnetic Recording Handbook," p. 397) in accordance with the formula:

$$S^* = 1-(M_r/H_c)/(dM/dH_{Hc})$$

(i.e., $M_r/H_c$ divided by the slope of the hysteresis loop at $H=H_c$, all subtracted from 1). Thus, when the slope of the hysteresis sloop is infinite, S*=1, and an essentially square loop with a sharp switching field is observed. A medium having S*=1 would be advantageous. However, when S*<1, a medium with a broad switching field distribution (which may offer advantages for certain applications) is obtained.

In the present medium, signal-to-noise ratio is determined in accordance with the method of Belk et al ("Measurement of the intrinsic signal-to-noise ratio for high-performance recording media," *J. Appl. Phys.*, vol. 59 (January 1986), p. 557). Briefly, the electronic noise of the recording medium is measured over a frequency range of interest (e.g., 0–20 MHz) using a spectrum analyzer. Thereafter, an "all-1's" signal is written at a selected frequency (e.g., 16 MHz), and the corresponding spectrum is recorded on the spectrum analyzer. After removing the signal peak from the post-signal spectrum via computer, one calculates the noise power per Hz by numerical integration (i.e., by subtracting the square of the voltage of each point in the post-signal spectrum from the square of each point in the electronic noise spectrum, multiplying by the frequency step size and dividing by the resolution band width of the spectrum analyzer). The signal-to-noise ratio is defined as:

SNR=10 log{ (signal zero to peak power per Hz)/noise power per Hz)}

A recording medium can be said to have "good environmental stability" if, under conventional conditions of use and storage, its magnetic properties do not change by more than 10% over a five year period of time, preferably less than 1% over the five-year period, and most preferably less than 0.1% over the five year period. Optionally, a recording medium has "good environmental stability" if, when measured over a temperature range of from −50° C. to 90° C. and a relative humidity range of from 10 to 90%, the magnetic properties of the recording medium change by a value of less than 20%, preferably less than 1%, and most preferably less than 0.1%.

Materials which produce some orientation of barium hexaferrite with its c-axis out-of-plane may be advantageously used in magnetic property-enhancing layers. Materials which provide some degree of desired orientation of barium hexaferrite and which may be suitable for use as a magnetic property-enhancing layer in the present invention include silicon, aluminum nitride (AlN), titanium nitride (TiN), yttria-stabilized zirconia ($Y_2O_3.nZrO_2$, or "YSZ") and zinc oxide (ZnO). Preferred magnetic property-enhancing layer materials include polysilicon, AlN, YSZ and ZnO.

In particular, when deposited on a carbon substrate (for example, by sputtering), polysilicon provides a significant out-of-plane orientation of a barium hexaferrite polycrystalline recording layer. Aluminum nitride, on the other hand, produces a random orientation in the magnetic recording layer material, similar to that produced by silicon nitride.

In a preferred embodiment of the present recording medium comprising one interlayer, the interlayer possesses more than one property advantageous for a magnetic recording medium (e.g., enhances a magnetic property and bars diffusion; enhances a magnetic property and improves adhesion; etc.). Particularly preferably, the interlayer adheres tightly to both the substrate and the recording layer, in addition to barring diffusion or enhancing a magnetic property of the medium. Most preferably, the interlayer possesses all three diffusion-barring, magnetic property-enhancing and adhesion-improving properties to provide a magnetic recording medium having high saturation magnetization and coercive force properties. For example, an interlayer made of polysilicon or AlN provides diffusion barrier, magnetic property-enhancing and adhesion-improving properties.

In another aspect of the present invention, at least two interlayers are sequentially deposited on a carbon substrate, and a barium hexaferrite layer is subsequently deposited thereon to form a magnetic recording medium. The interlayers, which differ from each other in the case where two interlayers are present, bar diffusion of atoms from the carbon substrate to the barium hexaferrite magnetic recording layer, improve adhesion between adjacent layers, induce an orientation as defined above, or possess a combination of these properties. Where more than two interlayers are present, adjacent interlayers are different, but non-adjacent interlayers may be either the same or different.

Where two or more interlayers are present, they may be deposited sequentially on the carbon substrate in any order which provides a functional magnetic recording medium. However, in a preferred embodiment of the present multi-interlayer recording medium, the interlayer adjacent to the carbon substrate bars diffusion of carbon atoms from the substrate, and the interlayer adjacent to the recording layer is a magnetic property-enhancing layer.

Adhesion of barium hexaferrite and some materials suitable as a diffusion barrier and/or a magnetic property-enhancing interlayer directly to a carbon substrate may sometimes be less than optimal. Accordingly, in a particularly preferred embodiment of the present recording medium, each interlayer improves adhesion between adjacent layers; i.e., after the interlayer material has been deposited separately onto each of the adjacent layers, but prior to deposition of any subsequent layer(s), the interlayer provides sufficient adhesion to each adjacent layer to prevent removal of material from the interlayer by wiping the interlayer with a cotton swab or a tissue under hand or finger pressure (e.g., under a frictional pressure of 50 g). The surface and the swab or tissue are visually examined (without magnification) for the presence of flakes. If no flakes are seen, the interlayer may be suitable as an adhesive layer.

A second test of adhesion, useful for determining the commercial acceptability of the interlayer in a recording medium, comprises scratching the deposited interlayer material with the tip of a tweezers under hand or finger pressure (as described above). A visible scratch in the surface indicates an unacceptable interlayer. Both tests should be performed to evaluate the commercial acceptability of the recording medium.

Suitable adhesive layers include metal films such as chromium or silicon. A preferred adhesive layer material is elemental chromium. For example, chromium-coated carbon substrates are stable up to temperatures of about 550° C. Deposition of a chromium film having a thickness of about 50–100 Å onto the carbon substrate usually increases the adhesion of a subsequently deposited interlayer to the carbon substrate. An increase in the substrate temperature above 550° C., however, results in diffusion of carbon atoms from the substrate to the surface of the directly-deposited chromium layer.

A material is acceptable as a "diffusion barrier" layer in the present recording medium when it prevents or inhibits for a length of time of at least one hour at 650° C. a decrease in one or more ambient-temperature magnetic properties of the recording medium which render the medium non-functional, and which result from diffusion of carbon atoms from the carbon substrate into the magnetic recording layer. A magnetic recording medium is rendered non-functional when either (a) during preparation of the medium, carbon is detected at the surface of the intermediate structure immediately prior to depositing the barium hexaferrite recording layer, (b) the remanent magnetization of the barium hexaferrite recording layer in both the perpendicular and parallel directions falls below 50 emu/cm$^3$, or (c) the coercivity of the barium hexaferrite recording layer in both the perpendicular and longitudinal directions falls below 500 Oe.

The present diffusion barrier layer provides the additional benefit of preventing oxidation of the carbon substrate during deposition of subsequent layers (e.g., the magnetic recording layer). A successful example of such a diffusion barrier interlayer is described in U.S. application Ser. No. 07/879,422, filed May 7, 1992, and comprises a silicon nitride film, sputter-deposited onto a carbon substrate.

The problems caused by diffusion of carbon atoms from a carbon substrate into subsequent layers, including the magnetic recording layer, are avoided in the present recording medium comprising a diffusion barrier layer. Such problems may include: (1) interference with the physical and magnetic properties of the recording layer; (2) physical changes in the substrate, such as an increase in the surface roughness, which consequently results in (i) an increase in the surface roughness of the magnetic recording layer and (ii) poor cohesion of the medium (i.e., adhesion of each layer to the adjacent layer(s); e.g., between the functional interlayer and each of the substrate and the magnetic recording layer in the three-layered medium); (3) interference with formation of a continuous magnetic recording layer; and (4) disruption of crystal formation and/or orientation in the magnetic recording layer.

The present diffusion barrier interlayer, therefore, should have a thickness sufficient to prevent diffusion of carbon atoms from the substrate into the magnetic recording layer under the deposition conditions required for the magnetic recording layer. Preferably, the diffusion barrier layer has a thickness of about 50–5,000 Å, more preferably about 100–2,000 Å, most preferably about 100–1,500 Å.

Materials in addition to polysilicon, aluminum nitride and silicon nitride which may be suitable as diffusion barrier layers in the present magnetic recording medium may include certain metal oxides, such as $Al_2O_3$ and $SrTiO_3$, and elemental metals (e.g., Cr and Pt). Some films may have insufficient adhesion to both carbon substrates and barium hexaferrite to serve as a sole functional interlayer. Accordingly, an adhesive interlayer must be interposed between layers in the following cases: (1) between the carbon substrate and any diffusion barrier or property-enhancing film deposited thereon which does not adhere well to carbon, and (2) between a barium hexaferrite layer and a diffusion barrier or property-enhancing film which does not adhere well to barium hexaferrite.

Preferred materials for the diffusion barrier layer include polysilicon, aluminum nitride (AlN) and silicon nitride for magnetic recording media which contain one, two or more interlayers.

In a preferred embodiment of the present recording medium comprising first and second interlayers, at least one interlayer possesses more than one diffusion barrier, orientation-inducing and/or adhesion-improving properties. Particularly preferably, the interlayers adjacent to the carbon substrate and to the barium hexaferrite recording layer adhere tightly to the substrate and the recording layer, respectively. Most preferably, the interlayer adjacent to the carbon substrate possesses diffusion barrier and adhesion-improving properties, and the interlayer adjacent to the barium hexaferrite recording layer possesses orientation-inducing and adhesion-improving properties, to provide a magnetic recording medium having high saturation magnetization and coercive force properties.

The Present Method

As described above, the carbon substrate may be cleaned prior to deposition of an interlayer. The interlayer(s) may be grown on the carbon substrate using any suitable process for depositing films of such materials, such as, for example, chemical vapor deposition (CVD), plasma enhanced CVD (PECVD), rapid thermal processing (RTP) or conventional sputtering. Preferably, the interlayer(s) are deposited by a sputtering process. Suitable sputtering processes include diode, direct current (dc), radio frequency (rf), triode and magnetron sputtering processes.

A typical deposition process for an interlayer according to the present invention includes the following conditions: a gas pressure ranging from about 1 to about 20 mTorr, preferably from about 3 to about 10 mTorr; an input power density ranging from about 0.1 W/cm$^2$ to about 100 W/cm$^2$, preferably from about 1 W/cm$^2$ to about 10 W/cm$^2$; and a substrate temperature of from 400° C. to 800° C., preferably from about 500° C. to about 700° C. The substrate temperature may be gradually raised from a lower temperature within this range to a higher temperature within this range. A typical interlayer has a thickness of from 100 Å to 1000 Å, preferably from about 100 Å to about 500 Å.

Elemental interlayers (e.g., silicon, chromium, molybdenum, etc.) may be deposited from an elemental target in an inert sputtering gas (such as argon). Nitride interlayers (e.g., silicon nitride, aluminum nitride, titanium nitride, etc.) may be deposited from either an elemental target or a compound target in an inert sputtering gas (such as argon) further containing 1–90% of nitrogen ($N_2$) gas. Molybdenum carbide may be deposited onto a carbon substrate from either an elemental target or a compound target in an inert sputtering gas (such as argon). Oxide interlayers may be deposited from either an oxide ceramic target or an elemental target in an inert sputtering gas (such as argon) further containing from 0.1 to 50% of oxygen ($O_2$) gas, preferably further containing 1–40% of oxygen.

Polysilicon may be sputtered using an argon sputtering gas and an input power density ranging from about 4 to about 8 W/cm$^2$ in a conventional sputtering apparatus. Aluminum nitride may be dc sputtered from an aluminum target using an argon-nitrogen sputtering gas as described above (preferably containing from about 10% to about 90% nitrogen) and an input power density ranging from about 1 mWatt/cm$^2$ to about 24 Watts/cm$^2$ (preferably 5 to 9 W/cm$^2$).

Conventionally, silicon nitride and other nitrides, including titanium nitride, are sputtered using an inert sputtering gas (such as argon), further containing nitrogen ($N_2$) gas (see *Thin Film Processes*, ed. John L. Vossen and Werner Kern, Academic Press, San Diego, 1978; in particular, see the article by J. L. Vossen and J. J. Cuomo). Rf diode sputtering of a silicon nitride film, for example, can be accomplished using a sputtering gas containing argon and 5–20% nitrogen (preferably about 10% nitrogen), gas pressures ranging from about 5–20 mTorr (preferably about 5–15 mTorr) and an input power ranging from about 0.5 to about 3 kW, in a conventional rf diode sputtering apparatus. The resulting silicon nitride film has a smooth surface which is stable at substrate temperatures ranging up to about 650°–675° C.

The process for producing the (substituted) barium hexaferrite magnetic recording layer may preferably be, but is not limited to, rf facing target sputtering, as described by Hoshi et al. (*IEEE Transactions on Magnetics*, Volume MAG-20, No. 5, September 1984, p. 800 ff.). Preferably, sputtering conditions include an atmosphere of argon containing 1–25% (preferably 10%) by partial pressure of oxygen at a total pressure of 0.1–100 mTorr (preferably, 3.0 mTorr), a discharge power density of 0.4–8 watts/cm$^2$ (preferably 2 watts/cm$^2$) rf per target using 2 facing targets, and a substrate temperature of 500°–750° C. (preferably 500°–700° C.), each target having a diameter of from 1.0–100 cm.

A barium hexaferrite thin film may be prepared by sputtering barium hexaferrite onto the interlayer-coated substrate using a dc facing target sputtering apparatus. Because barium hexaferrite is an oxide, the sputtering gas contains an inert gas, such as argon, mixed with oxygen gas. Generally, the inert gas contains about 2–25%, preferably about 5–15% oxygen gas. Overall sputtering gas pressures ranging from about 0.1 to about 20 mTorr, preferably about 0.3 to about 10 mTorr, and discharge current densities (Id) ranging from about 1 to about 50 milliamperes/cm$^2$, preferably about 5 to about 25 milliamperes/cm$^2$, produce adequate deposition rates and continuous thin films.

During barium hexaferrite deposition, the substrate temperature may be critical. Below about 500° C., the barium hexaferrite thin films have an amorphous structure with no peaks from barium hexaferrite hexagonal crystals being detected by X-ray diffraction. Above about 650° C., one obtains a film of hexagonal barium hexaferrite. Furthermore, some interlayer materials (e.g., chromium) may become unstable above about 650° C. To obtain a crystalline barium hexaferrite film during sputtering, it may be desirable to maintain the temperature of the substrate/interlayer structure at a temperature between 500° C. and 800° C., and preferably between 500° and 700° C., to ensure initial formation of a crystalline hexagonal barium hexaferrite thin film.

Preferred sputtering conditions for barium hexaferrite may require a substrate material which withstands temperatures of 500° C. in moderate vacuum conditions without degradation of its mechanical properties (smoothness and dimensional tolerance). Substrate materials such as aluminum and glass are not capable of withstanding such temperature and pressure conditions. Furthermore, the oxidized silicon used in the experiments described by Hoshi et al (*J. Appl. Phys.*, 57(1):4040–4042, 1985) is too delicate to survive in actual disk drive service.

Barium hexaferrite sputtering may advantageously employ barium hexaferrite disk-shaped targets. Substituted barium hexaferrite is hot isostatic pressed in air from a crystalline powder to form a target. The size of the sputtering target is not particularly critical, but it may advantageously have a diameter of from 2 to 20 cm. Sputtering should provide barium hexaferrite films having a thickness of 500–5,000 Å, more preferably 1,000–3,000 Å and most preferably 1,000–2,000 Å.

A barium hexaferrite film, deposited on a (multiple) interlayer-coated carbon substrate in the manner described above, may have the following magnetic properties: a saturation magnetization of from 100 to 380 emu/cm$^3$; a coercive force of from 1,000 to 10,000 Oe, preferably from 1,000 to 4,000 Oe in the recording direction; and a squareness of from 0.2 to 1, and preferably from 0.5 to 1, in the recording direction.

The deposited barium hexaferrite magnetic recording layer is typically quite hard and, therefore, it may not be necessary to apply a protective overcoat layer onto the barium hexaferrite layer. However, a protective overcoat layer may be deposited on the surface of the magnetic recording layer furthest removed from the substrate, if desired. Suitable overcoat layers are well-known and include, for example, films deposited by sputtering (such as $SiO_2$ or YSZ) or deposited by a spin-on method ($SiO_2$). These protective layers may be deposited according to their known deposition processes.

An adhesive layer may be deposited between any two layers having properties other than an adhesion-improving property, including between an overcoat layer and either the substrate or the recording layer. If desired, a lubricant may be applied to the surface of the barium hexaferrite layer or the protective overcoat layer. Such lubricants are well known in the art and disclosed, for example, in *Tribology and Mechanics of Magnetic Storage Devices*, B. Bhushan, Springer-Verlag, New York, N.Y. (1990).

The present magnetic recording medium has magnetic properties suitable for high density magnetic recording. For example, hexagonal barium hexaferrite films deposited at temperatures of about 500°–700° C. may have a coercive force parallel to the substrate ($Hc_{\parallel}$) of about 500–4500 Oe, preferably of 1,000–4,000 Oe, or a coercive force perpendicular to the substrate ($Hc_{\perp}$) of about 500–4500 Oe, preferably of 500–3,000 Oe.

Other features of the invention will become apparent in the course of the following descriptions of exemplary embodiments which are given for illustration of the invention and are not intended to be limiting thereof. In the following examples, all magnetic data have been corrected for the diamagnetism of the substrate and for the demagnetizing factor of the data taken perpendicular to the film plane.

EXAMPLES

Comparative Example 1

Control magnetic recording media were prepared by depositing a barium hexaferrite film directly onto an amorphous carbon substrate (a UDAC carbon disk, available from Kobe Steel USA) by dc facing target-type sputtering, using barium hexaferrite disk targets (5 cm diameter) having a composition of Ba:Fe:O=10.7 g: 57.5 g: 28 g in an argon-oxygen mixture (Ar/10% $O_2$, total pressure=3 mTorr), at a substrate temperature of 600°–700° C. to provide a number of control media. The barium hexaferrite films had a thickness of from 1,000 to 5,000 Å, and exhibited the following magnetic properties:
COERCIVE FORCE=710 Oe (parallel)
SQUARENESS=0.24 (parallel)
COERCIVE SQUARENESS=0 (parallel)

The barium hexaferrite films were loose and powdery and could easily be wiped off the substrate with a piece of tissue paper.

Example 1

Deposition of an Elemental Silicon Interlayer

Elemental silicon was deposited onto the UDAC substrate of Comparative Example 1 under the following conditions:
target: Si
sputtering gas: argon at a pressure of 3 mTorr
150 watts rf, 13.56 MHz on a 2" diameter target
substrate temperature rising from 500° to 650° C. during deposition
film thickness: about 300 Å

A substituted barium hexaferrite of the formula $Ba(TiZn)_{0.3}Fe_{11.4}O_{19}$ (modified MC-617, sold by Toda Kogyo Corp., 7-1, Yokogawa-shinmachi, Nishi-ku, Hiroshima, 733 Japan, prepared without a $SiO_2$ coating) was formed into a target, and a magnetic recording layer thereof was deposited on the silicon interlayer by rf facing target sputtering, as described by Hoshi et al (*IEEE Transactions on Magnetics*, Volume MAG-20, No. 5, September 1984, p. 800 ff.), under the following conditions:
sputtering gas: argon containing 10% oxygen partial pressure at a total pressure of 3.0 mTorr
discharge power: 40 watts rf per target using 2 facing targets 2 inches (5 cm) in diameter
substrate temperature: 660° C.
film thickness: 1,000–2,500 Å

The magnetic properties of the substituted barium hexaferrite film deposited on this silicon film include the following:
Saturation Magnetization: 320 emu/cm$^3$
Coercive force parallel to film plane: 1090 Oe
Coercive force perpendicular to film plane: 1740 Oe
Squareness parallel to film plane ($SQ_{\parallel}$): 0.33
Squareness perpendicular to film plane ($SQ_{\perp}$): 0.73
Coercive squareness (parallel)=0
Coercive squareness (perpendicular)=0.9

The hexagonal barium hexaferrite film shows a textural orientation of the c-axis of the grains perpendicular to the film plane. X-ray diffraction shows the expected hexagonal crystalline structure with a significant (008) peak confirming the c-axis out-of-plane texture. As is well known in magnetic recording literature (see *Magnetic Recording Handbook*, by C. Denis Mee and Eric D. Daniel, McGraw-Hill, New York, 1989), significant orientation of the easy axis of magnetization in the recording direction is highly desirable for high density and high signal-to-noise-ratio recording. Thus, a single interlayer of silicon provides advantageous magnetic properties for perpendicular recording applications.

Example 2

Deposition of an Aluminum Nitride Interlayer

Aluminum nitride was deposited onto the UDAC substrate of Comparative Example 1 under the following conditions:
target: Al
sputtering gas: 90% $N_2$/Ar at a pressure of 3 mTorr
329 V DC, 0.441 amperes on a 2" diameter target
substrate temperature: 660° C. during deposition
film thickness: about 500 Å

The substituted barium hexaferrite magnetic recording layer of Example 1 above was deposited thereon by the process of and under the same conditions as Example 1. The magnetic properties of the barium hexaferrite film deposited on the AlN-coated UDAC substrate include the following:
Saturation Magnetization: 250 emu/cm$^3$
Coercive force parallel to film plane: 1730 Oe
Coercive force perpendicular to film plane: 2080 Oe
Squareness parallel to film plane: 0.42
Squareness perpendicular to film plane: 0.81
Coercive squareness (parallel)=0.2
Coercive squareness (perpendicular)=0.8

The x-ray diffraction pattern of this film shows a strong AlN (002) peak indicating that the film has a strong (001) axis out-of-plane texture. In addition, the (008) and (107) peaks of barium hexaferrite are visible indicating a c-axis out-of-plane texture of the magnetic film. The larger coercivity out-of-plane and the remanence ratio indicate that a magnetic recording medium containing a carbon substrate, an aluminum nitride interlayer prepared in the manner described above and a barium hexaferrite magnetic recording layer is advantageous for perpendicular recording.

Examples 3 and 4

Deposition of a Yttria-stabilized Zirconia (YSZ) Interlayer on a Silicon Interlayer A silicon layer was first deposited on the UDAC substrate of Comparative Example 1 using a procedure otherwise substantially identical to that described in Example 1 above, but at a fixed substrate temperature of 660° C. A YSZ interlayer was then applied thereon under the following conditions:
target: YSZ ceramic
sputtering gas: less than 1% $O_2$/Ar at a pressure of 4 mTorr
100 watts rf, 13.56 MHz, 40–60 minutes on a 2"diameter target
substrate temperature: 505° C. or 660° C. during deposition The different deposition temperatures for the YSZ layer result in different barium hexaferrite (BaM) film textures, even though these films were the same substituted BaM material of Example 1, deposited by the same process and under the same conditions of Example 1. Deposition of YSZ at 505° C. gives a cubic YSZ film with a (111) axis out-of-plane texture, while the 660° C. temperature gives a YSZ film with a (200) out-of-plane texture.

The magnetic properties of the substituted BaM recording layer in the medium containing the YSZ interlayer deposited at 505° C. include:
Saturation Magnetization: 280 emu/cm$^3$
Coercive force parallel to film plane: 1000 Oe
Coercive force perpendicular to film plane: 1490 Oe
Squareness parallel to film plane: 0.28
Squareness perpendicular to film plane: 0.48
Coercive Squareness (parallel): 0
Coercive Squareness (perpendicular): 0.4

The magnetic properties of the substituted BaM recording layer in the medium containing the YSZ interlayer deposited at 660° C. include:
Saturation Magnetization: 280 emu/cm$^3$
Coercive force parallel to film plane: 1450 Oe
Coercive force perpendicular to film plane: 1960 Oe
Squareness parallel to film plane: 0.28
Squareness perpendicular to film plane: 0.69
Coercive Squareness (parallel): 0
Coercive Squareness (perpendicular): 0.7

Substituted BaM films deposited on YSZ films with different textures show no significant difference in magnetic properties. Each substituted BaM film shows a significant BaM c-axis out-of-plane texture, as confirmed by the presence of (008) and (107) peaks in the corresponding x-ray diffraction patterns.

Example 5

Deposition of a Zinc Oxide (ZnO) Interlayer onto a Silicon Interlayer

A silicon layer was first applied to the UDAC carbon substrate of Comparative Example 1 using essentially the same the procedure as Example 1, but at a fixed substrate temperature of 660° C. A ZnO interlayer was then deposited thereon under the following conditions:
target: ZnO ceramic
sputtering gas: 30–90% $O_2$/Ar at a pressure of 3 mTorr
60 watts rf, 13.56 MHz, on a 2" diameter target
substrate temperature: 400° C. during deposition
thickness: about 250 Å

These conditions gave a ZnO film having a wurtzite structure with a strong (002) out-of-plane texture, as determined by x-ray diffraction. This is similar to the result obtained when sputtering ZnO under the same conditions onto a bulk silicon single crystal substrate coated with native silicon oxide.

A barium hexaferrite magnetic recording layer was deposited thereon by the process of and under the same conditions as Example 1. The magnetic properties of the BaM films deposited on this ZnO-coated carbon substrate include:
Saturation Magnetization: 170 emu/cm$^3$
Coercive force parallel to film plane: 1390 Oe
Coercive force perpendicular to film plane: 1790 Oe
Squareness parallel to film plane: 0.35
Squareness perpendicular to film plane: 0.60
Coercive Squareness (parallel): 0
Coercive Squareness (perpendicular): 0.4

The magnetic recording film shows random BaM texture as confirmed by the presence of (107), (104) and (2011) peaks in the x-ray diffraction pattern. On the other hand, when BaM is sputtered onto ZnO on a silicon wafer, the BaM film shows a strong c-axis out of plane texture, with the (008) peak showing a width of only 2.4° in its x-ray rocking curve, indicating a very high level of orientation of the film. The reason for the difference in orientation is not known.

Comparative Examples 2–8

As described in U.S. application Ser. Nos. 07/879,422 and 08/203,760, single-interlayer magnetic recording media were prepared by depositing a metal film (Pt or Cr), an oxide film ($SiO_2$, $Al_2O_3$, ZnO) or silicon nitride (SiN) onto an amorphous carbon substrate, then depositing a barium hexaferrite layer onto the deposited interlayer material. Barium hexaferrite was deposited onto the interlayers by dc facing target-type sputtering using barium hexaferrite disk (6 cm diameter) targets. Barium hexaferrite films having a thickness of 1,000–5,000 Å were formed in each of Comparative Examples 2–8 under the film preparation conditions shown in Table 1 below.

TABLE 1

Barium hexaferrite film preparation conditions

| | |
|---|---|
| Sputtering gas | Ar + (0–25%) $O_2$ |
| Sputtering gas pressure | 0.5 mtorr |
| Target voltage | 180–260 V |
| Discharge current (6 cm diameter target) | 0.12–0.5 |
| Substrate temperature (output of a thermocouple located at substrate surface) | 500° C.–575° C. |
| Deposition rate | 15–110 Å/min |
| Film thickness | 1000–5000 Å |

*thickness of the layer was about 500 Å

Comparative Examples 2–3

For the metals Pt and Cr, argon was used as the sputtering gas, and sputtering was conducted using an input power of 300 W.

Substantial platinum crystallite growth occurred during its deposition on the heated carbon substrate, with the result that platinum crystallites gathered together and formed islands on the carbon substrate. As a result, the substrate surface became very rough, and carbon atoms diffused to the film surface during deposition. Hexagonal barium hexaferrite films were not formed on platinum coated carbon substrates.

Chromium-coated carbon substrates were stable up to temperatures of about 550° C. Hexagonal barium hexaferrite films deposited on chromium coated carbon substrates had a very smooth surface. X-ray diffraction analysis showed reflection peaks characteristic of the hexagonal barium hexaferrite phase. An increase in the substrate temperature above 550° C. produces results similar to the platinum-coated carbon substrate, with diffusion of carbon into the magnetic recording layer.

Comparative Examples 4–6

A sputtering gas of argon containing 10% oxygen and an input power of 1 kW were used for deposition of the oxide interlayers ($SiO_2$, $Al_2O_3$ and ZnO).

However, all oxide films ($SiO_2$, $Al_2O_3$, ZnO) deposited directly on the carbon substrate had insufficient adhesion and were easily removed from the carbon substrate. The barium hexaferrite films peeled off from each oxide-coated substrate both during and after deposition.

Comparative Example 7

A sputtering gas of argon containing 10% nitrogen was used for deposition of the silicon nitride interlayer. The adhesion of silicon nitride to the carbon substrate was excellent. Additionally, silicon nitride-coated substrates could be utilized at much higher temperatures than chromium-deposited substrates. The barium hexaferrite films deposited on the silicon nitride layer had a surface which was smoother than films deposited on the chromium-coated substrate and clearly showed X-ray diffraction peaks characteristic of hexagonal barium hexaferrite.

Further, deposition of a thin chromium film having a thickness of about 50–100 Å onto the carbon substrate increases the adhesion of a silicon nitride interlayer to the carbon substrate. Deposition of a thin chromium film onto the silicon nitride interlayer also increases the adhesion of the barium hexaferrite film to the silicon nitride interlayer.

Comparative Example 8

A silicon nitride film having a thickness of 500 Å was deposited onto each of a number of the carbon substrates of Comparative Example 1 using a sputtering gas of Ar+10% $N_2$ at a sputtering gas pressure of 10 mTorr. Barium hexaferrite films were then sputtered onto the silicon nitride interlayer using the sputtering targets of Example 1 and the deposition conditions shown in Table 2 below.

TABLE 2

Deposition conditions for Ba hexaferrite films

| | |
|---|---|
| Sputtering gas | Ar + 5% $O_2$ |
| Sputtering gas pressure (mTorr) | 0.5 |
| Discharge current (A) (6 cm target) | 0.2, 0.3, 0.5 |
| Deposition rate (Å/min) | 60, 89, 150 |
| Film thickness (Å) | 2700, 4000, 3000 |
| Substrate temperature (°C.) | 500, 550, 560, 575 |

A hexagonal barium hexaferrite film having the properties shown in Table 3 below was obtained with a deposition current of about 0.5 A, partial oxygen gas pressure of about 0.025 mTorr and a substrate temperature of 550° C. The crystal structure and c-axis orientation of the films were determined by X-ray diffraction (Cu Kα). The coercive force (Hc) and the saturation magnetization (Ms) of the films were measured with a vibrating sample magnetometer (VSM).

TABLE 3

Magnetic properties of Ba hexaferrite film deposited on $Si_xN_y$/C substrate

| | |
|---|---|
| Saturation magnetization | 280 emu/$cm^3$ |
| Coercive force (Hc parallel) | 1180 Oe |
| Coercive force (Hc perpendicular) | 1083 Oe |
| Squareness (Sq parallel) | 0.42 |
| Squareness (Sq perpendicular) | 0.31 |

Examples 6–13 and Comparative Example 9

In each of Examples 6–13 and Comparative Example 9, the interlayer(s) were deposited onto the UDAC substrate of Comparative Example 1, and with the exception of using a substituted barium hexaferrite having the formula $BaFe_{12-2x}Zn_xTi_xO_{19}$ (x=0.3; Hc=1860 Oe), the magnetic recording layer was deposited in accordance with the procedure and conditions of Comparative Example 1.

The following intermediate layers were individually deposited onto substrates: $Al_2O_3$, ZnO, $TiO_x$, TiN, $Si_xN_y$, CN, $Mo_2C$, and $MoO_2$. Sputtering targets containing the desired metals were used as the source of metal ions. An argon-oxygen sputtering gas was used for deposition of the oxide type intermediate layers $Al_2O_3$, ZnO, $MoO_2$, and $TiO_x$. An argon-nitrogen sputtering gas was used for deposition of the nitride intermediate layers ($Si_xN_y$, TiN, CN). A sputtering gas of argon containing nitrogen using a Mo target resulted in deposition of the carbide intermediate layer ($Mo_2C$).

In Table 4 below, $TiO_x$ and $Mo_yN$ indicate layers in which $0<x\leq2$ and $0<y\leq1.5$ (preferably in which $1\leq x\leq2$ and $1y\leq1.5$), but in which the exact stoichiometry is not specifically known.

The substituted barium hexaferrite was deposited onto each of the intermediate layer-coated carbon substrates described above, under the conditions described in Comparative Experiment 1 above. The adhesion properties and magnetic properties of the resulting substituted barium hexaferrite films are shown in Table 5 below:

TABLE 4

Table of Sputtering Conditions for Intermediate Layers
(reactive gas mixed with Argon)

| Intermediate Layer | Total Pressure (mTorr) | % Oxygen | % Nitrogen |
|---|---|---|---|
| $Si_xN_y$ | 3 | — | 50 |
| $Al_2O_3$ | 4 | 50 | — |
| ZnO | 3 | 30 | — |
| $TiO_x$ | 2 | 1–30 | — |
| TiN | 2 | — | 18–50 |
| CN | 4 | — | 80 |
| $MoO_2$ | 5 | 30 | — |
| $Mo_yN$* | 4 | — | 50 |

*Although $Mo_yN$ could be deposited onto a silicon wafer under these conditions, on carbon all that is seen with x-ray diffraction is pure $Mo_2C$.

TABLE 5

Adhesion and Magnetic Properties of Barium Hexaferrite Films
on Various Single Interlayer-Carbon Substrate Media

| Intermediate Layer | $H_c$ (para) | $H_c$ (perp) | SQ (para) | SQ (perp) | Adhesion |
|---|---|---|---|---|---|
| $Si_xN_y$ | 2270 | 2680 | 0.60 | 0.91 | Good |
| $Al_2O_3$ | — | — | — | — | film can be rubbed off with cotton swab |
| ZnO | — | — | — | — | film can be rubbed off with cotton swab |
| $TiO_x$ | 320 | 370 | 0.35 | 0.15 | black powder on surface can be blown off |
| TiN | 710 | 1400 | 0.19 | 0.39 | cloudy film can be rubbed off with cotton swab |
| CN | 703 | 640 | 0.32 | 0.27 | cloudy film can be rubbed off with cotton swab |
| $Mo_2C$ | — | — | — | — | loose brown powder can be blown off |
| $MoO_2$ | — | — | — | — | brown powder on surface can be rubbed off with cotton swab |

$H_c$ = Coercive Force (Oe)
SQ = Squareness
cotton swab = Q-TIP ®

In the experiments of Examples 6–12 and Comparative Example 3 described above, oxide, nitride and carbide intermediate layers were evaluated for their ability to (1) adhere to a carbon substrate and (2) prevent carbon diffusion from a carbon substrate into a barium hexaferrite magnetic layer. The magnetic properties and the adhesion of the intermediate layer to the carbon substrate and to the barium hexaferrite magnetic layer were also evaluated.

In Comparative Example 3, silicon nitride ($Si_xN_y$) was deposited as a thin intermediate layer showing good adhesion to the carbon substrate. The barium hexaferrite deposited on the silicon nitride layer had good magnetic properties (coercive force and squareness).

TiN, the interlayer of Example 6, is known for use as a diffusion barrier with silicon wafers. It is, therefore, thought that TiN should provide a good diffusion barrier between the carbon substrate and the barium hexaferrite magnetic layer. Surprisingly, however, TiN does not show good adhesive properties to the doped BaM when deposited onto carbon. This magnetic recording layer is hazy and has poor adhesion to the TiN/C substrate. Thus, TiN appears to necessitate an additional interlayer to improve its adhesion to (substituted) BaM. The coercivity of the doped barium hexaferrite film was low ($Hc_{perp}$=1450 Oe) relative to the coercivity of a barium hexaferrite film deposited on $Si_xN_y$ and sputtered from the same target ($Hc_{perp}$=2100 Oe).

As a control, TiN was sputtered onto a silicon (Si) substrate, followed by deposition of barium hexaferrite. X-ray diffraction again showed only weak barium hexaferrite lines and no TiN lines. A depth profile of the film using X-ray photoelectron spectroscopy revealed TiSiO and $TiO_x$ layers below the barium hexaferrite. No nitride (TiN) was detected. It can be concluded from this control experiment that oxygen from the barium hexaferrite displaces the nitrogen in the TiN film rendering the TiN film unsuitable as an intermediate layer for carbon substrates. Accordingly, any additional interlayer deposited between TiN-coated carbon and (substituted) BaM should also act as an oxidation-preventing film (a "reverse diffusion barrier" layer, to inhibit diffusion of oxygen into the TiN).

$Al_2O_3$, the interlayer of Example 7, is an extensively studied material. Thin films of $Al_2O_3$ have been deposited by sputtering and CVD (see "The Materials Science of Thin Films", Milton Ohring, Academic Press, Inc., Boston, 1992, page 547ff).

ZnO, $TiO_x$, CN, $MoO_2$ and $Mo_yN$ (Examples 8–12) are oxides or nitrides having properties similar to $Al_2O_3$ and TiN. Thus, one having ordinary skill in the area of magnetic recording materials expects each of these materials to be an adequate diffusion barrier and adhesion-improving interlayer. In contrast to this expectation, only $Si_xN_y$ and AlN provide both (1) an effective carbon diffusion barrier and (2) adequate adhesion to both the carbon substrate and the (substituted) BaM recording layer. Thus, each of $Al_2O_3$, ZnO, $TiO_x$, CN, $MoO_2$ and $Mo_yN$ also appear to need a second interlayer to (a) improve adhesion to either or both of the carbon substrate and the (substituted) BaM recording layer, to (b) bar diffusion of carbon atoms from the substrate, and/or (c) to prevent oxidation and/or other chemical transformations (e.g., in the case of $Mo_yN$), and thereby take advantage of the beneficial diffusion barrier and/or orientation-inducing properties of these materials.

In the experiments described in the above Examples and Comparative Examples, many metal, oxide, nitride and carbide intermediate layers were evaluated for their ability to prevent carbon diffusion from a carbon substrate into a barium hexaferrite magnetic layer. The adhesion of the intermediate layer to the carbon substrate and to the barium hexaferrite magnetic layer was also evaluated.

Table 6 below summarizes pertinent data for each of the Examples and Comparative Examples above. In Table 6, the symbol "⊥" refers to the value perpendicular to the plane of the magnetic recording medium, the symbol "∥" refers to the value parallel to the plane of the magnetic recording medium, and Example Nos. C 1, C 2 and C 3 refer to comparative examples.

7. The magnetic recording medium of claim 1, wherein said carbon substrate has an apparent density of 1.75 or more.

8. The magnetic recording medium of claim 1, wherein said carbon substrate is amorphous and rigid, and has an apparent density of 1.75 or more.

\* \* \* \* \*

TABLE 6

| Example No. | Interlayer | Coercivity ⊥ | ∥ | ⊥/∥ | Squareness ⊥ | ∥ | ⊥/∥ | Coercive Squareness ⊥ | ∥ | $Mr_\perp t$* | Notes |
|---|---|---|---|---|---|---|---|---|---|---|---|
| 1 | Si | 1740 | 1090 | 1.60 | 0.73 | 0.33 | 2.2 | 0.9 | 0 | 5.9 | |
| 2 | AlN | 2080 | 1730 | 1.20 | 0.81 | 0.43 | 1.9 | 0.8 | 0.2 | 2.5 | Zn/Ti-substituted BaM |
| 3 | YSZ on $Si_n$ | 1490 | 1000 | 1.49 | 0.48 | 0.28 | 1.7 | 0.4 | 0 | 0.93 | YSZ deposited at 505° C. |
| 4 | YSZ on $Si_n$ | 1960 | 1450 | 1.35 | 0.69 | 0.28 | 2.5 | 0.7 | 0 | 2.4 | YSZ deposited at 600° C. |
| 5 | ZnO on $Si_n$ | 1790 | 1390 | 1.29 | 0.60 | 0.35 | 1.7 | 0.4 | 0 | 2.5 | |
| 6 | TiN | 1400 | 710 | 1.97 | 0.39 | 0.19 | 2.1 | 0.2 | 0 | 0.56 | Zn/Ti-substituted BaM |
| 9 | TiO | 370 | 320 | 1.16 | 0.15 | 0.35 | 0.43 | — | 0 | — | Zn/Ti-substituted BaM |
| 10 | CN | 640 | 703 | 0.91 | 0.27 | 0.32 | 0.84 | — | 0 | — | Zn/Ti-substituted BaM |
| C 1 | none | — | 710 | — | — | 0.24 | — | — | — | — | |
| C 2 | $Si_xN_y$ | 1083 | 1180 | 0.92 | 0.31 | 0.42 | 0.74 | — | — | — | BaM deposited at 550° C. |
| C 3 | $Si_xN_y$ | 2680 | 2270 | 1.18 | 0.91 | 0.60 | 1.5 | 0.8 | 0.6 | 3.0 | Zn/Ti-substituted BaM deposited at 600–700° C. |

*: in memu/cm²

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A magnetic recording medium, comprising:

a carbon substrate;

a magnetic recording layer of the formula $BaFe_{12}O_{19}$ or $Ba(M^1M^2)_xFe_{12-2x}O_{19}$, wherein $0<x<4$, and either:

(i) $M^1$ and $M^2$ are the same and are selected from the group consisting of Al, Ga and Cr, or (ii) $M^1$ is selected from the group consisting of Co, Zn, Cu, Ni and combinations thereof, and $M^2$ is selected from the group consisting of Ti, Ir, Ge, Sn, Zr, V, Nb, Ta, Mo, Si and combinations thereof; and a first interlayer therebetween selected from the group consisting of silicon and aluminum nitride.

2. The magnetic recording medium of claim 1, wherein said coercivity is from 1,000 to 4,000 Oe, said remanence-thickness product is from 0.5 to 5 memu/cm², said coercive squareness is from 0.5 to 1, and said signal-to-noise ratio is greater than 18 dB.

3. The magnetic recording medium of claim 1, wherein said coercivity is from 1,500 to 3,000 Oe and said signal-to-noise ratio is greater than 28 dB.

4. The magnetic recording medium of claim 1, further comprising a second interlayer between said first interlayer and said magnetic recording layer selected from the group consisting of zinc oxide and yttria-stabilized zirconia.

5. The magnetic recording medium of claim 4, wherein said first interlayer is silicon.

6. The magnetic recording medium of claim 1, wherein said carbon substrate is amorphous and rigid.